United States Patent

[11] 3,603,936

[72] Inventors Dennis P. Attwood
Winchester;
David M. Syme, Otterbourne; Harold W. Tuffill, Brambridge, Eastleigh, all of, England
[21] Appl. No. 883,055
[22] Filed Dec. 8, 1969
[45] Patented Sept. 7, 1971
[73] Assignee International Business Machines Corporation
Armonk, N.Y.

[54] MICROPROGRAMMED DATA PROCESSING SYSTEM
20 Claims, 4 Drawing Figs.

[52] U.S. Cl. .......... 340/172.5
[51] Int. Cl. .......... G06f 11/04
[50] Field of Search .......... 340/172.5

[56] References Cited
UNITED STATES PATENTS

| | | | |
|---|---|---|---|
| 3,325,788 | 6/1967 | Hackl .......... | 340/172.5 |
| 3,500,328 | 3/1970 | Wallis .......... | 340/172.5 |
| 3,405,258 | 10/1968 | Godoy et al. .......... | 340/172.5 |
| 3,518,413 | 6/1970 | Holtey .......... | 340/172.5 X |

FOREIGN PATENTS

| | | |
|---|---|---|
| 1,038,710 | 8/1966 | Great Britain |

*Primary Examiner*—Paul J. Henon
*Assistant Examiner*—Ronald F. Chapuran
*Attorneys*—Hanifin and Jancin and Edward S. Gershuny

ABSTRACT: Apparatus for injecting simulated monitoring or control data into a microprogrammed data processing system for diagnostic purposes to initiate a particular system test or response. The data injection takes place at a preselected stage during the execution of a microprogram which stage is identified from microprogram addressing or clocking information.

INVENTORS
DENNIS P. ATTWOOD
DAVID M. SYME
HAROLD W. TUFFILL

BY Edward S. Gershuny
ATTORNEY

MICROPROGRAMMED DATA PROCESSING SYSTEM

BACKGROUND OF THE INVENTION

This invention relates to microprogrammed data processing systems.

Microprogrammed data processing systems of the kind illustrated in FIGS. 1 to 4 have main data processing circuitry including a main store, in which data and a program of instructions are stored, and a central processing unit (CPU). Data and instructions are interchanged between the main store and the CPU, and the data is processed in the CPU in a manner defined by the instructions. A microprogrammed system is one in which an individual program instruction does not specify all the separate operations necessary to accomplish the purpose of the instruction, but instead contains the address of the start of a subprogram of microinstructions known as a microprogram. The microinstructions define individually the basic operations which must be performed by the system to accomplish the purpose of the program instruction or macroinstruction as it is normally called. Microprograms can be stored in the main store but in the embodiments described herein, they are retained in their own store in the CPU.

The main data processing circuitry has bit storage positions, for example in the form of latches or registers, which provide monitoring or control information for the system, e.g. error or status information such as denotes the occurrence of a parity error or the availability of a peripheral unit for service. The system is designed so that a particular system response can be initiated if certain values enter these bit storage positions. For example, the system can include instruction retry means which responds to an error indication during execution of a microprogram by causing the system to reattempt execution of the microprogram.

Alternatively a microprogram can cause the interrogation of some of the bit storage positions of the main data processing circuitry at some point during its execution, for the purpose of making a branching decision.

SUMMARY OF THE INVENTION

This invention is based on the concept that, for diagnostic or test purposes, it is desirable to be able to inject data into these bit storage positions at a predetermined stage during the execution of a microprogram, in order to simulate a particular state of the system and to initiate a particular system response deliberately other than by means of the microprogram. This facility enables testing, for example, of the operation of an instruction retry means at any stage in the execution of any microprogram by simulating an error. It will be appreciated that such testing could not be achieved by microinstructions of the microprogram itself. The error indication can be produced by direct setting of a bit storage position constituting an error check latch. Alternatively it can be produced by the injection of, say, a parity error into good data in the bit storage positions of the main data processing circuitry whereby the check latch is automatically set by error detecting circuitry. Such a facility can also enable any particular branch of a microprogram to be tested by simulating in the bit storage positions of the main data processing circuitry states which cause the system to follow that branch. The microprogrammed data processing system illustrated in FIGS. 1 to 4 each include a data forcing system to carry out this data injection.

The invention provides a microprogrammed data processing system including main data processing circuitry having bit storage positions which provide monitoring or control data for the system, and a selectively operable data forcing system comprising an injection register storing simulated monitoring or control data, connecting means for connecting bit storage positions of the injection register to respective ones of the bit storage positions of the main data processing circuitry, and identifying means, responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry, thereby to initiate a particular system test or response deliberately other than by means of the microprogram.

DESCRIPTION OF THE DRAWINGS

The present invention will now be described further, by way of example only, with reference to preferred embodiments thereof as illustrated in the accompanying diagrammatic drawings, in which.

DETAILED DESCRIPTION

Figure 1:
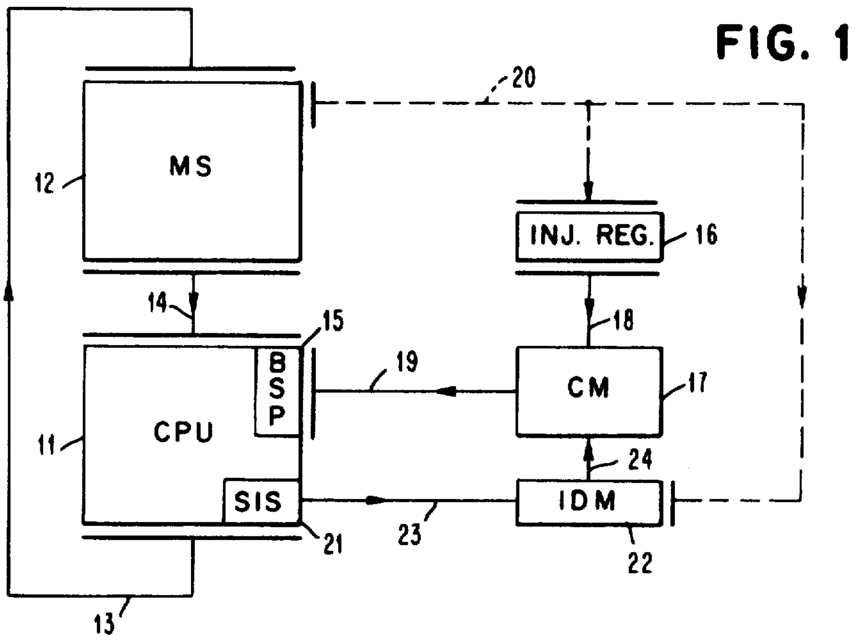
FIG. 1 is a general block diagram of a data processing system according to the present invention.

In the drawings, various data channels are denoted for simplicity by single lines, but it should be understood that these lines are representational of the data flow only, and their use does not imply the exclusion of transfer of data in parallel on such a line.

In the complete specification of our United Kingdom Letters Pat. No. 1,038,710, there is described a microprogrammed data processing system in which, by means of a DIAGNOSE program instruction, a microprogram routine can be run which comprises any section of a stored microprogram. The microinstruction at which the routine is to end can be identified, and when that microinstruction is reached, an instruction fetch routine is initiated. In the preferred embodiments of the present invention described herein, use is also made of a DIAGNOSE instruction, but there are two main differences, firstly the instruction causes injection of simulated data for the system, i.e., artificial test or diagnostic data corresponding to data that might otherwise arise in the system, and secondly the instruction of itself does not determine termination of the microprogram at some intermediate microinstruction. Construction of these embodiments involves hardware changes in our existing systems, in that at least the injection register and the associated connecting means have to be additionally provided. A further important change will be apparent from a preferred feature of the invention, namely that at least one of the bit storage positions of the main data processing circuitry is exclusively accessible by the data forcing system for entry of simulated monitoring or control data for the system. For example it has been common practice for safety reasons to make some of the bit storage positions of the main data processing circuitry, e.g., the error check latch, inaccessible for entry of data therein under program control; that is, it was not possible by means of programming to enter predetermined data deliberately into these bit storage positions. With the present invention, this limitation need no longer apply, since these bit storage positions can be associated with the data forcing system as explained, as well as with their existing data entry circuitry (which does not enter simulated data).

With reference to FIG. 1 a data processing system according to the present invention includes a central processing unit 11 and a main store 12 connected for information exchange by lines 13 and 14. Some of the bit storage positions of the CPU, e.g., registers or latches, are designated as bit storage positions 15. A stage information source 21 is drawn as a dotted section in one corner of the central processing unit 11.

The dots signify that it is optional whether the stage information source 21 forms part of the CPU. This source provides information from which the stage reached in the execution of a microprogram is determined.

A data forcing system comprises an injection register 16, a connecting means 17 and an identifying means 22. Before the start of the microprogram, data which simulates monitoring or control data for the system and which is to be forced into bit storage positions 15, is loaded into the injection register, for example, from a register (not shown) in the main store 12. The dotted line 20 represents the effective flow of this data rather than the actual route which is normally via the CPU if the data comes from the main store. An alternative is to load the data into the injection register via a keyboard. The bit storage positions of the injection register are connected to the bit storage positions 15 by the lines 18 and 19 and the connecting means 17. The connecting means 17 prevents flow of data from the injection register 16 to the bit storage positions 15 until it is conditioned by a pulse on line 24 from the identifying means 22. The connecting means consists for example of several AND gates. Information specifying a particular stage in the execution of a microprogram is transferred from a general register in the main store (or otherwise) to the identifying means 22, before the start of the microprogram, as indicated by the line 20. During execution of the microprogram the identifying means 22 receives stage identifying information as indicated by the line 23. When it identifies the particular stage specified by the preloaded information it emits a conditioning signal on line 24 to the connecting means 17 which results in data from the injection register 16 being entered in the bit storage positions 15.

Figure 2:
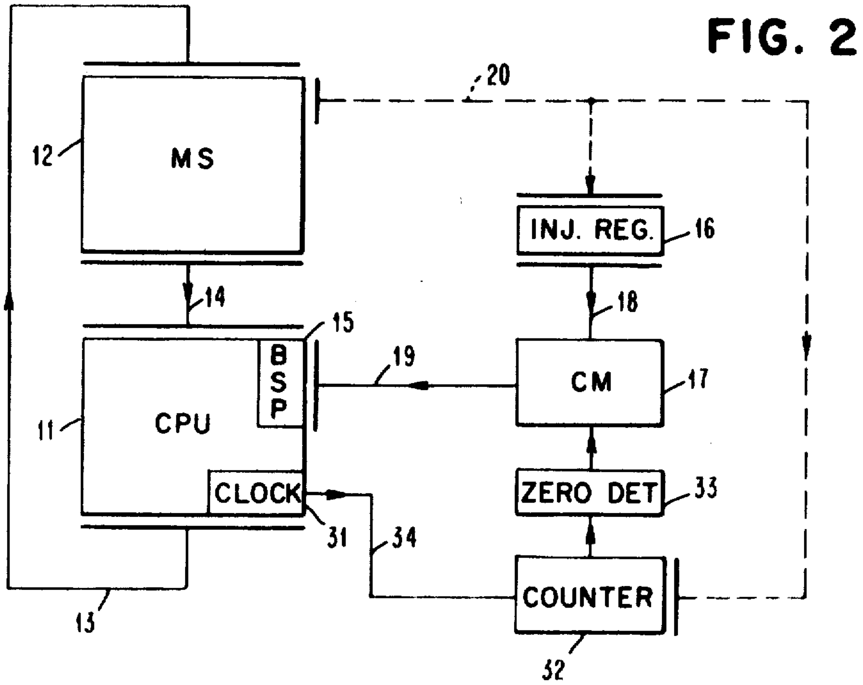
FIG. 2 is a block diagram of the data processing system of FIG. 1 using one particular form of data forcing system.

FIG. 2 shows the data processing system of FIG. 1 employing one specific method of stage identification. This method makes use of the fact that most data processing systems operate synchronously in phase with output signals from a clock in the CPU shown as 31 in FIG. 2. Each micro-operation of a microprogram is allowed a fixed number of clock pulses in which to complete its function. Consequently, the stage reached in the execution of a microprogram can be determined by counting the number of clock pulses from the start of the microprogram. In the system of FIG. 2, a number corresponding to the stage at which data injection is to take place is loaded into the counter 32 as indicated by line 20 before execution of the microprogram starts. After it has started, clock pulses from clock 31 are used to decrement counter 32 which will reach zero at a time corresponding to the predetermined stage. A zero count detector 33 immediately produces a conditioning pulse to the connecting means 17 whereupon the data of injection register 16 is injected into the bit storage positions 15 of the CPU.

Several variations of this method are possible. In one variation the zero detector is replaced by another detector to which the indicated line 20 leads instead of to counter 32, and the counter is incremented up from zero so that the detector produces the conditioning pulse to the connecting means 17 when the count in the counter 32 equal a number preloaded via line 20 in the detector.

Even when the data processing system is not synchronous, i.e., the micro-operations take a variable time, the method of FIG. 2 can be used as long as there is some output signal source, indicating completion of the successive micro-operations, which can be used to alter the counter 32.

Figure 3:
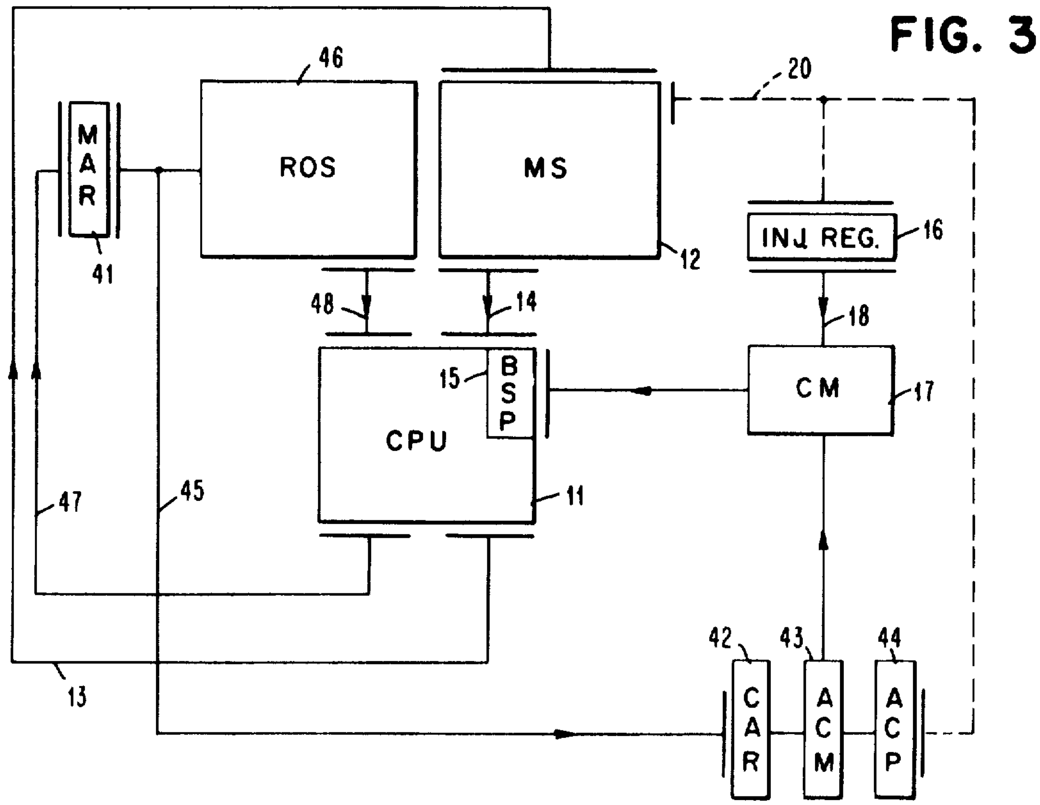
FIG. 3 is a block diagram of the data processing system of FIG. 1 using another particular form of the data forcing system.

FIG. 3 shows the data processing system of FIG. 1 employing another method of stage identification. In data processing system of the kind illustrated in FIGS. 1 to 4, microprograms are often stored in a read only store as diagrammatically indicated at 46 in FIG. 3. The read only store 46 is addressed by means of a microprogram address register 41. In the register 41 is stored the address of the microinstruction required by the CPU for execution. As a microinstruction is executed the address in the microprogram address register 41 is updated by the CPU. Thus the stage reached in the execution of the microprogram is defined by the address in the microprogram address register 41.

In the system of FIG. 3 the address of the microinstruction at which data is to be forced into the bit storage positions 15 is loaded as indicated by the line 20 into an address compare register 44. During execution of the microprogram the address in the microprogram address register identifying the stage reached in execution of the microprogram is transferred over line 45 to a current address register 42 which is updated as the address changes. An address compare means 43 compares the addresses in the two registers 42 and 44 for equality and conditions the connecting means 17 when the addresses are the same.

In the embodiments that have been described, all the contents of the injection register are entered in the bit storage positions 15. If desired, presettable masking means can be provided for effectively masking selected bit storage positions of the injection register during entry of data from the injection register to the bit storage positions of the main data processing circuitry, e.g. following the techniques of associative stores.

In another variant of the invention, several injection registers are employed to enable the injection of data at more than one stage during the execution of a microprogram. Each such injection register is connected by its own connecting means to bit storage positions 15. Each bit storage position 15 is then operatively associated with the respective bit storage positions in all the injection registers. The identifying means is modified to identify several particular stages instead of one. For example, in a modification of the system of FIG. 2, several value detector devices are attached to the counter, each detector device being connected to one of the connecting means. The contents of each injection register are then forced into bit storage positions 15 as each value detector signals that its corresponding stage has been reached.

Figure 4:
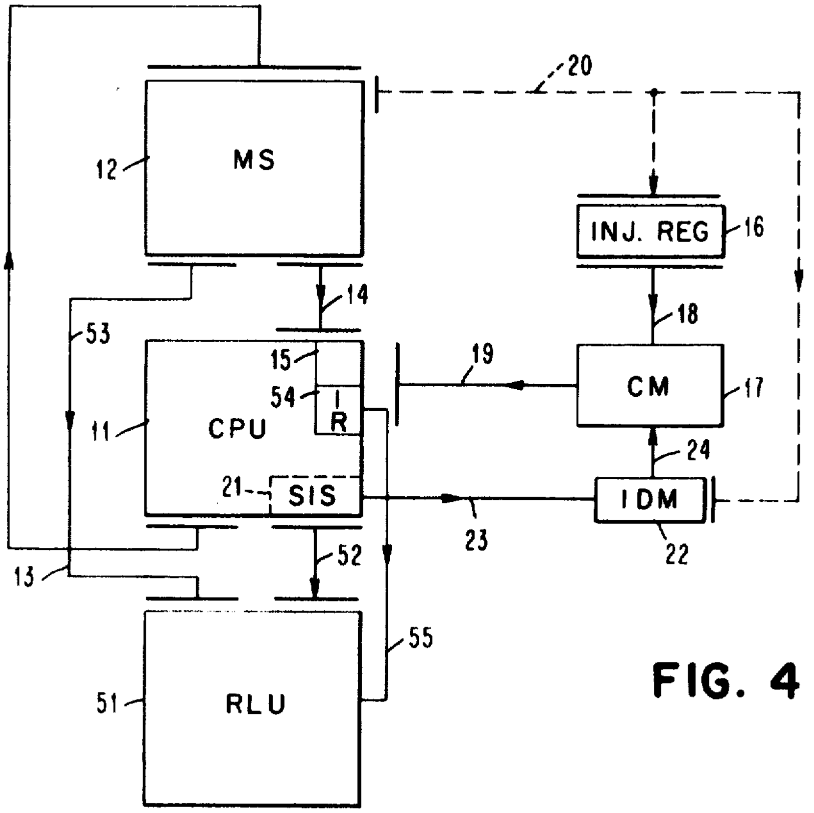
FIG. 4 is a block diagram of another form of data processing system according to the present invention.

FIG. 4 illustrates a data processing system according to the present invention in which one specific example of the use of the invention is given. The data processing system incorporates an instruction retry means 51, sometimes known as a recovery log unit. A retry means such as this one is a device which enables a data processing system to attempt to repeat the execution of a macro or program instruction if an error occurs during an attempt at execution. In order to do this it stores selected register contents and latch states from the CPU together with a certain amount of data from the main store. Information from the CPU is received on line 52 and from the main store on line 53. Each program instruction has two phases corresponding to two distinct sections of the associated microprogram. One phase is the 'E' or execution phase and is followed by the 'I' or next instruction fetch phase. During the 'E' phase the CPU and main store information being used may be changing under program control but during the 'I' phase it should remain constant. The recovery log unit stores this information during an 'I' phase and assumes it to be valid. It is then frozen during the 'E' phase of the next macroinstruction. If a fault occurs during the 'E' phase of this instruction, the system can be restored to its state before the start of the instruction and the instruction can be 'retried' by using the frozen data in the recovery log unit. A fault is brought to the attention of the unit by an indicating register 54 which is shown as being a part of the bit storage positions 15.

By employing a data forcing system as described above the retry means is tested by forcing error indicating information into the register 54 at a suitable point during the execution of the microprogram corresponding to the macroinstruction. The register 54 is exclusively accessible by the data forcing system for entry of simulated error data. In all the systems discussed the injection of simulated data takes place, in practice, as a result of the execution of a special purpose program instruction known as a DIAGNOSE instruction. This instruction immediately precedes the program instruction during which it is desired to force data into some or all of the bit storage positions 15 in the CPU. THe DIAGNOSE instruction contains an operation code identifying uniquely the operation to be carried out, i.e., the data injection, address information for the starting point of an associated microprogram, which actually controls the operations, and a main store address. The main store address is that of a register containing the data to be injected and, for example, in the system of FIG. 2, the count to be placed in the counter. This main store register will have been filled with appropriate data by conventional programming techniques via the usual input media. Execution of the DIAGNOSE instruction microprogram causes the loading of the injection register and counter. Forcing of the desired data then takes place as described in detail above at the predetermined stage in the execution of the microprogram called up by the program instruction immediately following the DIAGNOSE instruction in the main store.

Although for the embodiments described herein, no specific circuits have been illustrated for the injection register, the connecting means, and the bit storage positions of the main data processing circuitry, these are conventional and will be readily apparent to a person skilled in the art. For example, in one arrangement the injection register comprises a plurality of bistable flip-flops whose '1' outputs lead to respective AND gates forming the connecting means, the AND gates being conditioned by a pulse from the identifying means. The bit storage positions of the main data processing circuitry comprise further bistable flip-flops having set and reset inputs, the set inputs each being coupled to the respective AND gate output, and the reset inputs each being coupled via an inverter to the respective AND gate output. Although this arrangement is preferred, if it is desired only to inject "1"s, the couplings via the inverters to the reset inputs can be omitted. A slower arrangement comprises conventional shift register circuitry.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A microprogrammed data processing system including:
main data processing circuitry having bit storage positions which provide monitoring or control data for the system; and
a selectively operable data forcing system comprising
an injection register storing simulated monitoring or control data;
connecting means for connecting bit storage positions of the injection register to respective ones of the bit storage positions of the main data processing circuitry, at least one of said bit storage positions of the main data processing circuitry being exclusively accessible by the data forcing system for entry of simulated monitoring or control data for the system; and
identifying means responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry;
thereby to initiate a particular system test or response deliberately other than by means of the microprogram.

2. A microprogrammed data processing system including:
main data processing circuitry having bit storage positions which provide monitoring or control data for the system; and
a selectively operable data forcing system comprising
a plurality of injection registers storing simulated monitoring or control data;
a plurality of connecting means each of which is for connecting bit storage positions of a respective one of the injection registers to respective ones of the bit storage positions of the main data processing circuitry; and
identifying means responsive to the main data processing circuitry to identify a plurality of predetermined stages microprogram. the execution of a microprogram, said identifying means being adapted on identification of each of said predetermined stages to condition an appropriate one of the connecting means to enter the contents of one or more of the bit storage positions of its respective injection register in said respective bit storage positions of the main data processing circuitry;
thereby to initiate a particular system test or response deliberately other than by means of the microprogram.

3. A system as claimed in claim 2 wherein:
the main data processing circuitry includes an operation retry means the working of which is initiated in response to a predetermined state of an indicating register;
said indicating register forming at least part of the said bit storage positions of the main data processing circuitry into which said simulated data can be entered by the data forcing system.

4. A microprogrammed data processing system including:
main data processing circuitry having bit storage positions which provide monitoring or control data for the system; and
a selectively operable data forcing system comprising
an injection register storing simulated erroneous monitoring or control data;
connecting means for connecting bit storage positions of the injection register to respective ones of the bit storage positions of the main data processing circuitry; and
identifying means responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry;
thereby to initiate a particular system test or response deliberately other than by means of the microprogram.

5. A system as claimed in claim 4 in which
at least one of said bit storage positions of the main data processing circuitry is exclusively accessible by the data forcing system for entry of simulated monitoring or control data for the system.

6. A microprogrammed data processing system including:
main data processing circuitry having bit storage positions which provide monitoring or control data for the system; and
a selectively operable data forcing system comprising
an injection register storing simulated monitoring or control data;
connecting means for connecting bit storage positions of the injection register to respective ones of the bit storage positions of the main data processing circuitry;
identifying means responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry; and
presettable masking means for effectively masking selected bit storage positions of the injection register during entry of data from the injection register to the bit storage positions of the main data processing circuitry;
thereby to initiate a particular system test or response deliberately other than by means of the microprogram.

7. A system as claimed in claim 6 wherein:
the main data processing circuitry includes an operation retry means the working of which is initiated in response to a predetermined state of an indicating register;
said indicating register forming at least part of the said bit storage positions of the main data processing circuitry into which said simulated data can be entered by the data forcing system.

8. A system as claimed in claim [illegible] wherein:
the data forcing system comprises;
more than one said injection register,
more than one said connecting means each of which is for connecting bit storage positions of a respective one of the injection registers to said respective bit storage positions of the main data processing circuitry; and
identifying means responsive to the main data processing circuitry to identify a plurality of predetermined stages in the execution of a microprogram;
said identifying means being adapted on identification of each of said predetermined stages to condition an appropriate one of said connecting means to enter the contents of one or more of the bit storage positions of its respective injection register into said respective bit storage positions of the main data processing circuitry.

9. A microprogrammed data processing system including:
main data processing circuitry having bit storage positions which provide monitoring or control data for the system and having a count signal source operable to produce a count signal at predetermined intervals during the execution of a microprogram; and
a selectively operable data forcing system comprising
an injection register storing simulated monitoring or control data;
connecting means for connecting bit storage positions of the injection register to respective ones of the bit storage positions of the main data processing circuitry; and
identifying means responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry;
said identifying means including a counter whose contents main altered by a fixed amount on receipt of each of said count signals, and counter testing means which tests the contents of the counter for a predetermined value microinstruction; which identifies said predetermined stage when the contents of the counter equal said predetermined value;
thereby to initiate a particular system test or response deliberately other than by means of the microprogram.

10. A system as claimed in claim 9 wherein:
the data forcing system comprises;
more than one said injection register,
more than one said connecting means each of which is for connecting bit storage positions of a respective one of the injection registers to said respective bit storage positions of the main data processing circuitry, and
identifying means responsive to the main data processing circuitry to identify a plurality of predetermined stages in the execution of a microprogram;
said identifying means being adapted on identification of each of said predetermined stages to condition an appropriate one of said connecting means to enter the contents of one or more of the bit storage positions of its respective injection register into said respective bit storage positions of the main data processing circuitry.

11. A system as claimed in claim 9 wherein:
the main data processing circuitry includes an operation retry means the working of which is initiated in response to a predetermined state of an indicating register;
said indicating register forming at least part of the said bit storage positions of the main data processing circuitry into which said simulated data can be entered by the data forcing system.

12. A system as claimed in claim 9 further including:
presettable masking means for effectively masking selected bit storage positions of the injection register during entry of data from the injection register to the bit storage positions of the main data processing circuitry.

13. A system as claimed in claim 14 wherein:
the data forcing system comprises;
more than one said injection register,
more than one said connecting means each of which is for connecting bit storage positions of a respective one of the injection registers to said respective bit storage positions of the main data processing circuitry, and
identifying means responsive to the main data processing circuitry to identify a plurality of predetermined stages in the execution of a microprogram;
said identifying means being adapted on identification of each of said predetermined stages to condition an appropriate one of said connecting means to enter the contents of one or more of the bit storage positions of its respective injection register into said respective bit storage positions of the main data processing circuitry.

14. A system as claimed in claim 13 wherein:
the main data processing circuitry includes an operation retry means the working of which is initiated in response to a predetermined state of an indicating register;
said indicating register forming at least part of the said bit storage positions of the main data processing circuitry into which said simulated data can be entered by the data forcing system.

15. A microprogrammed data processing system including:
main data processing circuitry having bit storage positions which provide monitoring or control data for the system and having an address register for containing the address of the current microinstruction; and
a selectively operable data forcing system comprising
an injection register storing simulated monitoring or control data;
connecting means for connecting bit storage positions of the injection register to respective ones of the bit storage positions of the main data processing circuitry; and
identifying means responsive to the main data processing circuitry to identify a predetermined stage in the execution of a microprogram, said identifying means being adapted on identification of said predetermined stage to condition the connecting means to enter the contents of one or more of the bit storage positions of the injection register in said respective bit storage positions of the main data processing circuitry;
said identifying means including an address compare register, means for loading the address compare register with an address corresponding to said predetermined stage, and address comparison means operable to compare the contents of the address register for equality with the contents of the address compare register to identify the said predetermined stage;
thereby to initiate a particular system test or response deliberately other than by means of the microprogram.

16. A system as claimed in claim 15 wherein:
the data forcing system comprises;
more than one said injection register,
more than one said connecting means each of which is for connecting bit storage positions of a respective one of the injection registers to said respective bit storage positions of the main data processing circuitry, and
identifying means responsive to the main data processing circuitry to identify a plurality of predetermined stages in the execution of a microprogram;
said identifying means being adapted on identification of each of said predetermined stages to condition an appropriate one of said connecting means to enter the contents of one or more of the bit storage positions of its respective injection register into said respective bit storage positions of the main data processing circuitry.

17. A system as claimed in claim 15 wherein:
the main data processing circuitry includes an operation retry means the working of which is initiated in response to a predetermined state of an indicating register;

said indicating register forming at least part of the said bit storage positions of the main data processing circuitry into which said simulated data can be entered by the data forcing system.

18. A system as claimed in claim 15 further including:

presettable masking means for effectively masking selected bit storage positions of the injection register during entry of data from the injection register to the bit storage positions of the main data processing circuitry.

19. A system as claimed in claim 18 wherein:

the data forcing system comprises;

more than one said injection register, more than one said connecting means each of which is for connecting bit storage positions of a respective one of the injection registers to said respective bit storage positions of the main processing circuitry; and identifying means responsive to the main data processing circuitry to identify a plurality of predetermined stages in the execution of a microprogram;

said identifying means being adapted on identification of each of said predetermined stages to condition an appropriate one of said connecting means to enter the contents of one or more of the bit storage positions of its respective injection register into said respective bit storage positions of the main data processing circuitry.

20. A system as claimed in claim 19 wherein:

the main data processing circuitry includes an operation retry means the working of which is initiated in response to a predetermined state of an indicating register;

said indicating register forming at least part of the said bit storage positions of the main data processing circuitry into which said simulated data can be entered by the data forcing system.